United States Patent
Bang

(10) Patent No.: US 12,054,142 B2
(45) Date of Patent: Aug. 6, 2024

(54) APPARATUS FOR CONTROLLING STOP OF VEHICLE AND METHOD THEREOF

(71) Applicants: HYUNDAI MOTOR COMPANY, Seoul (KR); Kia Corporation, Seoul (KR)

(72) Inventor: Kyung Joo Bang, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 309 days.

(21) Appl. No.: 17/590,907

(22) Filed: Feb. 2, 2022

(65) Prior Publication Data
US 2023/0030503 A1    Feb. 2, 2023

(30) Foreign Application Priority Data
Jul. 30, 2021  (KR) .................. 10-2021-0100977

(51) Int. Cl.
*B60W 30/095* (2012.01)
*B60W 30/18* (2012.01)

(52) U.S. Cl.
CPC .... *B60W 30/0953* (2013.01); *B60W 30/0956* (2013.01); *B60W 30/18109* (2013.01); *B60W 2420/403* (2013.01)

(58) Field of Classification Search
CPC ......... B60W 30/0953; B60W 30/0956; B60W 30/18109; B60W 2420/403; B60W 2540/26; B60W 2554/802; B60W 2554/804; B60W 2720/10; B60W 2720/106; B60W 30/09; B60W 60/001; B60W 30/181; B60W 30/08; B60W 40/02; B60W 40/105; B60W 2520/04
See application file for complete search history.

(56) References Cited

U.S. PATENT DOCUMENTS

| | | | |
|---|---|---|---|
| 11,513,519 B1* | 11/2022 | Akella | G05D 1/0276 |
| 11,801,864 B1* | 10/2023 | Arora | G06N 3/084 |
| 2018/0018529 A1* | 1/2018 | Hiramatsu | B60W 30/0956 |
| 2018/0154891 A1* | 6/2018 | Schneider | B60T 8/00 |
| 2019/0161082 A1* | 5/2019 | Fairgrieve | B60W 50/0097 |

(Continued)

FOREIGN PATENT DOCUMENTS

| | | | | |
|---|---|---|---|---|
| JP | 2014213777 A | * | 11/2014 | B60T 7/22 |
| KR | 10-2020-0129351 A | | 11/2020 | |

(Continued)

*Primary Examiner* — Anne Marie Antonucci
*Assistant Examiner* — Patrick Daniel Mohl
(74) *Attorney, Agent, or Firm* — MORGAN, LEWIS & BOCKIUS LLP

(57) ABSTRACT

Disclosed are an apparatus for controlling a stop of a vehicle and a method thereof. In order to prevent a collision accident occurring by a second rear vehicle in an emergency stop of the vehicle in advance, the apparatus includes a vehicle sensor that detects various types of information on a target vehicle, a rear sensor that detects a first rear vehicle and a second rear vehicle driving behind the target vehicle, and a controller that is electrically connected to the vehicle sensor and the rear sensor to control an emergency stop of the target vehicle in consideration of a state of a field of view of the second rear vehicle with respect to the target vehicle when the target vehicle is stopped in emergency.

20 Claims, 12 Drawing Sheets

(56) References Cited

U.S. PATENT DOCUMENTS

| | | | |
|---|---|---|---|
| 2020/0130662 A1* | 4/2020 | Buerkle | B60W 30/09 |
| 2020/0307567 A1* | 10/2020 | Ghose | B60W 60/0015 |
| 2020/0353925 A1 | 11/2020 | Kim | |
| 2021/0061265 A1* | 3/2021 | Furtado | B60R 21/0132 |
| 2021/0271249 A1* | 9/2021 | Kobashi | B60W 60/00272 |
| 2021/0402995 A1* | 12/2021 | Jung | B60W 30/18109 |
| 2022/0001860 A1* | 1/2022 | Do | B60W 30/09 |
| 2022/0135042 A1* | 5/2022 | Konishi | B60W 30/0956 701/119 |
| 2022/0169254 A1* | 6/2022 | Strobel | G01S 13/867 |
| 2022/0250624 A1* | 8/2022 | Park | G06T 7/30 |

FOREIGN PATENT DOCUMENTS

| | | | | |
|---|---|---|---|---|
| WO | WO-2017038289 A1 * | 3/2017 | | B60R 21/00 |
| WO | WO-2018166747 A1 * | 9/2018 | | B60W 30/143 |

* cited by examiner

APPARATUS FOR CONTROLLING STOP OF VEHICLE AND METHOD THEREOF

CROSS-REFERENCE TO RELATED APPLICATION

This application claims the benefit of priority to Korean Patent Application No. 10-2021-0100977, filed in the Korean Intellectual Property Office on Jul. 30, 2021, the entire contents of which are incorporated herein by reference.

TECHNICAL FIELD

The present disclosure relates to a technology for controlling a stop of a vehicle in consideration of the visibility condition of a rear vehicle traveling in the same lane as the vehicle when an emergency situation (e.g., driver's drowsy driving, severe pain due to deterioration of health, fainting, and the like) occurs in the vehicle traveling on a road.

BACKGROUND

In general, the driver of a vehicle should focus on safe driving while keeping eyes forward while driving, but drowsy driving due to mental and physical fatigue, sudden myocardial infarction due to health problems, or loss of consciousness often occurs. The driver's emergency situation may endanger the safety of the driver as well as the passengers.

Recently, in order to promote the safety of a driver as well as passengers, there has been developed a technology for sounding a warning sound or automatically controlling the driving of a vehicle when an emergency situation occurs to the driver.

The technology for controlling the driving of a vehicle may include a lane departure warning system (LDWS), a lane keeping assist system (LKAS), a blind spot detection (BSD) system, an advanced smart cruise control (ASCC) system, a forward collision warning system (FCWS), a driver drowsiness detection system, a pedestrian detection (PD) system, a traffic sign recognition (TSR) system, a blind-spot view monitoring (BVM) system, and a traffic jam assist (TJA) system.

Because the technology for controlling the driving of a vehicle performs automatic stopping of the vehicle without considering the visibility states of rear vehicles traveling in the same lane as the vehicle when an emergency situation occurs to a driver, when the field of view of a second rear vehicle with respect to the vehicle is not secured due to a first rear vehicle, a collision accident caused by the second rear vehicle cannot be prevented in advance.

The information disclosed in the Background section above is to aid in the understanding of the background of the present disclosure, and should not be taken as acknowledgement that this information forms any part of prior art.

SUMMARY

The present disclosure has been made to solve the above-mentioned problems occurring in the prior art while advantages achieved by the prior art are maintained intact.

An aspect of the present disclosure provides an apparatus for controlling a stop of a target vehicle and a method thereof, which can control emergency stopping of the vehicle in consideration of the visibility state of a rear vehicle traveling in the same lane as the vehicle when the vehicle is stopped in emergency, such that it is possible to prevent a collision accident that may be caused by the rear vehicle in advance when the vehicle is stopped in emergency.

Another aspect of the present disclosure provides an apparatus for controlling a stop of a target vehicle and a method thereof, which can control the emergency stop of the vehicle in consideration of the visibility state of the second rear vehicle when the vehicle is stopped in emergency in a situation in which the vehicle, the first rear vehicle and the second rear vehicle are sequentially driving, such that it is possible to prevent a collision accident that may be caused by the second rear vehicle in advance when the vehicle is stopped in emergency even though the field of view of the second rear vehicle is not secured due to the first rear vehicle.

Still another aspect of the present disclosure provides an apparatus for controlling a stop of a vehicle and a method thereof, which can estimate the relative distance and relative speed of the target vehicle with the second rear vehicle according to the virtual stop of the vehicle and adjust the speed (acceleration or deceleration) of the vehicle based on the collision risk corresponding to the relative distance and the relative speed when the field of view of the second rear vehicle with respect to the vehicle is not secured due to the first rear vehicle when the vehicle is stopped in emergency in a situation where the vehicle, the first rear vehicle and the second rear vehicle are sequentially driven, such that it is possible to prevent a collision accident that may be caused by the second rear vehicle in advance when the vehicle is stopped in emergency.

The technical problems to be solved by the present disclosure are not limited to the aforementioned problems, and any other technical problems not mentioned herein will be clearly understood from the following description by those skilled in the art to which the present disclosure pertains. Also, it may be easily understood that the objects and advantages of the present disclosure may be realized by the units and combinations thereof recited in the claims.

According to an aspect of the present disclosure, an apparatus for controlling a stop of a vehicle includes a vehicle sensor that detects various types of information on a target vehicle, a rear sensor that detects a first rear vehicle and a second rear vehicle driving behind the target vehicle, and a controller that is electrically connected to the vehicle sensor and the rear sensor to control an emergency stop of the target vehicle in consideration of a state of a field of view of the second rear vehicle with respect to the target vehicle when the target vehicle is stopped in emergency.

In an embodiment, the controller may adjust a speed of the target vehicle based on a collision risk of the second rear vehicle when the field of view of the second rear vehicle with respect to the target vehicle is not secured due to the first rear vehicle.

In an embodiment, the controller may estimate a relative distance and a relative speed of the target vehicle with the second rear vehicle according to a virtual stop of the target vehicle, and adjust a speed of the target vehicle based on a collision risk corresponding to the relative distance and the relative speed when the field of view of the second rear vehicle with respect to the target vehicle is not secured due to the first rear vehicle.

In an embodiment, the controller may decrease deceleration of the target vehicle when the collision risk is high, and increase the deceleration of the target vehicle when the collision risk is low.

In an embodiment, the controller may determine that the field of view of the second rear vehicle with respect to the target vehicle is not secured when at least one of a visibility limitation of the second rear vehicle according to an overall height of the target vehicle and an overall height of the first rear vehicle or the visibility limitation of the second rear vehicle according to an overall width of the target vehicle and an overall width of the first rear vehicle occurs.

In an embodiment, the controller may determine that the field of view of the second rear vehicle is not secured when the overall height of the target vehicle is lower than the overall height of the first rear vehicle.

In an embodiment, the controller may determine that the field of view of the second rear vehicle is secured only when the second rear vehicle is spaced apart from the first rear vehicle by more than a threshold distance when the overall height of the target vehicle is higher than the overall height of the first rear vehicle.

In an embodiment, the controller may calculate the threshold distance based on the overall height of the first rear vehicle, the separation distance between the target vehicle and the first rear vehicle, and the overall height of the target vehicle.

In an embodiment, the controller may set a threshold area based on the overall width of the target vehicle and the overall width of the first rear vehicle, and determine that the field of view of the second rear vehicle is not secured when all or a part of the second rear vehicle is included in the threshold area.

In an embodiment, the controller may set a straight line having a largest inclination among straight lines where a rear right end of the target vehicle and a rear right side of the first rear vehicle meet as a right boundary line of the threshold area, and set a straight line having a smallest inclination among straight lines where a rear left end of the target vehicle and a rear left side surface of the first rear vehicle meet as a left boundary line of the threshold area.

According to another aspect of the present disclosure, a method of controlling a stop of a vehicle includes detecting, by a vehicle sensor, various types of information on a target vehicle, detecting, by a rear sensor, a first rear vehicle and a second rear vehicle driving behind the target vehicle, and controlling, by a controller, an emergency stop of the target vehicle in consideration of a state of a field of view of the second rear vehicle with respect to the target vehicle when the target vehicle is stopped in emergency, wherein the controller is electrically connected to the vehicle sensor and the rear sensor.

In an embodiment, the method may include adjusting a speed of the target vehicle based on a collision risk of the second rear vehicle when the field of view of the second rear vehicle with respect to the target vehicle is not secured due to the first rear vehicle.

In an embodiment, the method may include estimating a relative distance and a relative speed of the target vehicle with the second rear vehicle according to a virtual stop of the target vehicle when the field of view of the second rear vehicle with respect to the target vehicle is not secured due to the first rear vehicle, and adjusting a speed of the target vehicle based on a collision risk corresponding to the relative distance and the relative speed.

In an embodiment, the method may include decreasing deceleration of the target vehicle when the collision risk is high, and increasing the deceleration of the target vehicle when the collision risk is low.

In an embodiment, the method may include first determining that the field of view of the second rear vehicle is not secured based on an overall height of the target vehicle and an overall height of the first rear vehicle, second determining that the field of view of the second rear vehicle is not secured based on an overall width of the target vehicle and an overall width of the first rear vehicle, and final determining that the field of view of the second rear vehicle is not secured based on at least one of the first determining or the second determining.

In an embodiment, the method may include determining that the field of view of the second rear vehicle is not secured when the overall height of the target vehicle is lower than the overall height of the first rear vehicle.

In an embodiment, the method may include determining that the field of view of the second rear vehicle is secured only when the second rear vehicle is spaced apart from the first rear vehicle by more than a threshold distance when the overall height of the target vehicle is higher than the overall height of the first rear vehicle.

In an embodiment, the method may further include calculating the threshold distance based on the overall height of the first rear vehicle, a separation distance between the target vehicle and the first rear vehicle, and the overall height of the target vehicle.

In an embodiment, the method may include setting a threshold area based on the overall width of the target vehicle and the overall width of the first rear vehicle, and determining that the field of view of the second rear vehicle is not secured when all or a part of the second rear vehicle is included in the threshold area.

In an embodiment, the method may include setting a straight line having a largest inclination among straight lines where a rear right end of the target vehicle and a rear right side of the first rear vehicle meet as a right boundary line of the threshold area, and setting a straight line having a smallest inclination among straight lines where a rear left end of the target vehicle and a rear left side surface of the first rear vehicle meet as a left boundary line of the threshold area.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
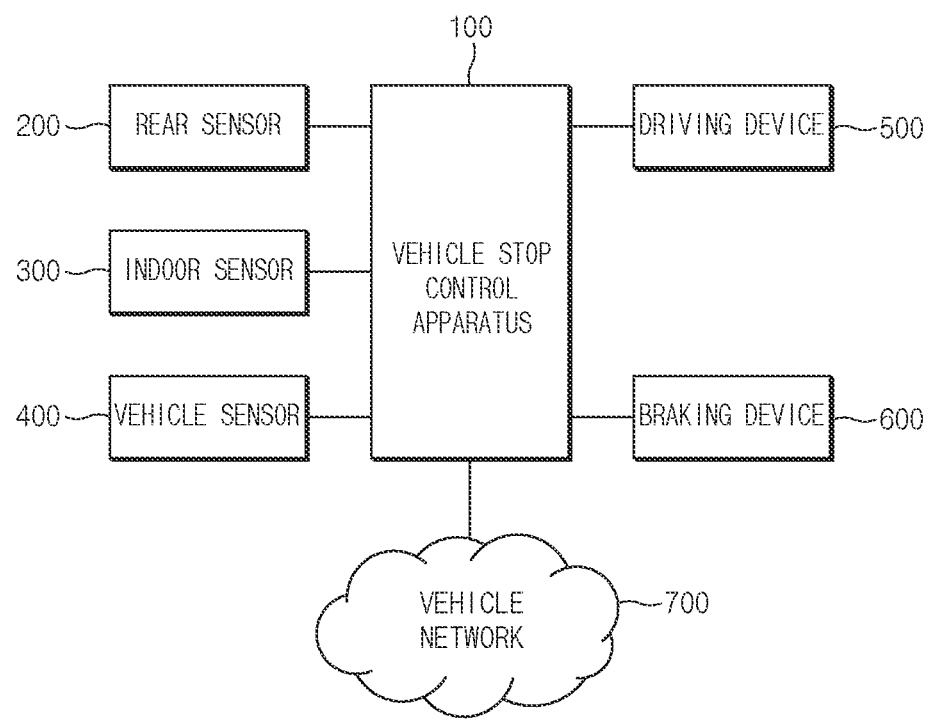
FIG. 1 is an exemplary view of a vehicle system to which an embodiment of the present disclosure is applied.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is an exemplary view of a vehicle system to which an embodiment of the present disclosure is applied.

As shown in FIG. 1, a vehicle system to which an embodiment of the present disclosure is applied may include an apparatus 100 for controlling a stop of a vehicle, a rear sensor 200, an indoor sensor 300, a vehicle sensor 400, a driving device 500, a braking device 600, and a vehicle network 700.

The apparatus 100 for controlling a stop of a vehicle according to an embodiment of the present disclosure may control emergency stopping of the vehicle in consideration of the visibility state of a rear vehicle traveling in the same lane as the vehicle when the vehicle is stopped in emergency, such that it is possible to prevent a collision accident that may be caused by the rear vehicle in advance when the vehicle is stopped in emergency.

The apparatus 100 for controlling a stop of a vehicle according to an embodiment of the present disclosure may control the emergency stop of the vehicle in consideration of the visibility state of the second rear vehicle when the vehicle is stopped in emergency in a situation in which the vehicle, the first rear vehicle and the second rear vehicle are sequentially driving, such that it is possible to prevent a collision accident that may be caused by the second rear vehicle in advance when the vehicle is stopped in emergency even though the field of view of the second rear vehicle is not secured due to the first rear vehicle.

The apparatus 100 for controlling a stop of a vehicle according to an embodiment of the present disclosure may estimate a relative distance and a relative speed of the vehicle with the second rear vehicle according to the virtual stop of the vehicle and adjust the speed (acceleration or deceleration) of the vehicle based on a collision risk corresponding to the estimated relative distance and relative speed when the field of view of the second rear vehicle with respect to the vehicle is not secured due to the first rear vehicle when the vehicle is stopped in emergency in a situation where the vehicle, the first rear vehicle and the second rear vehicle are sequentially driven, such that it is possible to prevent a collision accident that may be caused by the second rear vehicle in advance when the vehicle is stopped in emergency.

The rear sensor 200, which is mounted on the rear of the vehicle, may include, for example, a radar, and may detect the overall height, the overall width, the speed, the location, and the like of a rear vehicle travelling in the rear of the vehicle.

When a first rear vehicle and a second rear vehicle sequentially follow the vehicle on which the rear sensor 200 is mounted, the rear sensor 200 may measure the overall height, overall width, speed, and location of the first rear vehicle and also measure the speed and location of the second rear vehicle.

The indoor sensor 300 may be a sensor that is mounted inside the vehicle to detect the driver's condition (e.g., the driver's drowsy driving, pain due to health deterioration, fainting, and the like), and may include a camera as an example.

The vehicle sensor 400 may be mounted on the vehicle to detect vehicle information (e.g., vehicle speed, acceleration, deceleration, or steering angle).

The driving device 500, which refers to a power train including an engine and a transmission, may vary the speed (acceleration, deceleration) of the vehicle by adjusting the driving force under control of the apparatus 100 for controlling a stop of a vehicle.

The braking device 600 may vary the speed (acceleration, deceleration) of the vehicle by adjusting the braking force under control of the apparatus 100 for controlling a stop of a vehicle.

The vehicle network 700 may include a controller area network (CAN), a controller area network with flexible data-rate (CAN FD), a local interconnect network (LIN), FlexRay, a media oriented systems transport (MOST), Ethernet, and the like. Through the vehicle network 700, the apparatus 100 for controlling a stop of a vehicle may collect various types of vehicle information.

Figure 2:
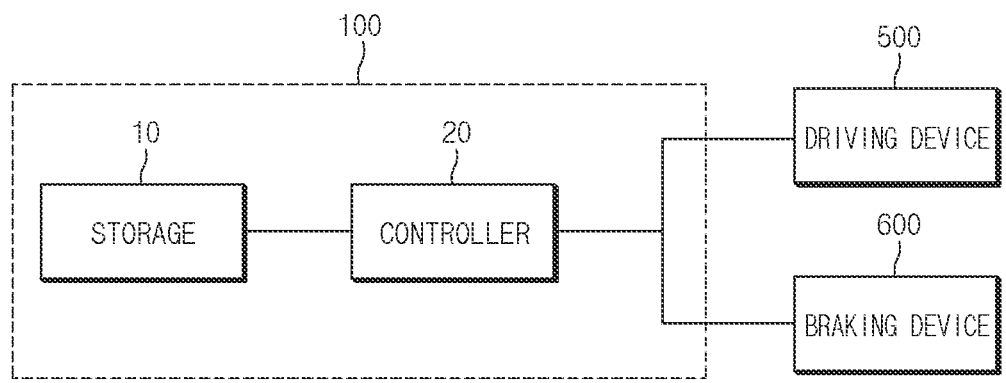
FIG. 2 is a block diagram of an apparatus for controlling a stop of a vehicle according to an embodiment of the present disclosure.

FIG. 2 is a block diagram of an apparatus for controlling a stop of a vehicle according to an embodiment of the present disclosure.

As shown in FIG. 2, the apparatus 100 for controlling a stop of a vehicle according to an embodiment of the present disclosure may include storage 10 and a controller 20 electrically connected to the storage 10. In this case, depending on a scheme of implementing the apparatus 100 for controlling a stop of a vehicle according to an embodiment of the present disclosure, each component may be combined with each other to be implemented as one, or some components may be omitted.

Looking at each of the components, first, the storage 10 may store various logics, algorithms and programs required in a process of controlling an emergency stop of the vehicle in consideration of the visibility state of a rear vehicle traveling in the same lane as the vehicle when the vehicle is stopped in emergency.

When the vehicle is stopped in emergency in a situation where the vehicle and the first and second rear vehicles are sequentially driven, the storage 10 may store various logics, algorithms and programs required in a process of controlling the emergency stop of the vehicle in consideration of the visibility state of the second rear vehicle.

When the vehicle is stopped in emergency in a situation where the vehicle and the first and second rear vehicles are sequentially driven, the storage 10 may store various logics, algorithms and programs required in a process of estimating the relative distance and relative speed with the second rear vehicle according to a virtual stop of the vehicle and adjusting the speed (acceleration or deceleration) of the vehicle based on a collision risk corresponding to the estimated relative distance and relative speed when the field of view of the second rear vehicle with respect to the vehicle is not secured due to the first rear vehicle.

The storage 10 may include at least one type of a storage medium of memories of a flash memory type, a hard disk type, a micro type, a card type (e.g., a secure digital (SD) card or an extreme digital (XD) card), and the like, and a random access memory (RAM), a static RAM (SRAM), a read-only memory (ROM), a programmable ROM (PROM), an electrically erasable PROM (EEPROM), a magnetic memory (MRAM), a magnetic disk, and an optical disk type memory.

The controller 20 may perform overall control such that each of the components can perform its function normally. The controller 20 may be implemented in the form of hardware or software, or may be implemented in the form of a combination of hardware and software. Preferably, the controller 20 may be implemented with a microprocessor, but is not limited thereto.

In particular, when a vehicle (target vehicle) is stopped in emergency, the controller 20 may control the emergency stop of the vehicle in consideration of the visibility state of a rear vehicle traveling in the same lane as the vehicle.

When the vehicle is stopped in emergency in a situation where the vehicle and the first and second rear vehicles are sequentially driven, the controller 20 may control an emergency stop of the vehicle in consideration of the visibility state of the second rear vehicle.

When the vehicle is stopped in emergency in a situation where the vehicle and the first and second rear vehicles are sequentially driven, the controller 20 may estimate the relative distance and relative speed of the vehicle with the second rear vehicle according to a virtual stop of the vehicle and adjust the speed (acceleration or deceleration) of the vehicle based on a collision risk corresponding to the estimated relative distance and relative speed of the vehicle when the field of view of the second rear vehicle with respect to the vehicle is not secured due to the first rear vehicle.

Hereinafter, the operation of the controller 20 will be described in detail with reference to FIGS. 3A to 5.

Figure 3A:
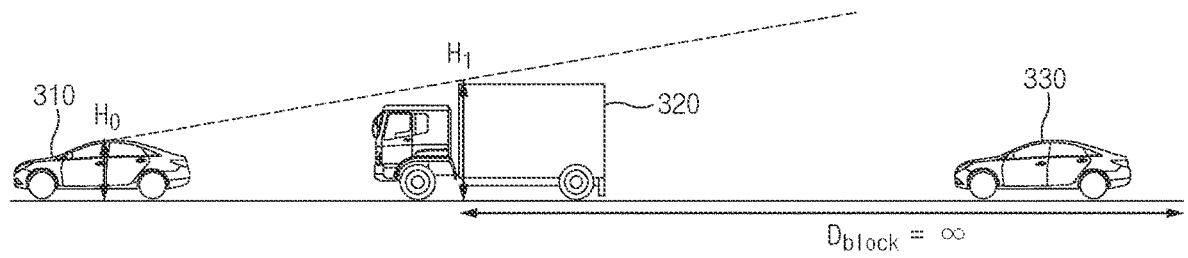
FIG. 3A is an exemplary diagram illustrating a process in which a controller provided in an apparatus for controlling a stop of a vehicle according to an embodiment of the present disclosure determines whether the field of view of the second rear vehicle with respect to the vehicle is obscured based on the overall height of the first rear vehicle.

FIG. 3A is an exemplary diagram illustrating a process in which a controller provided in an apparatus for controlling a stop of a vehicle according to an embodiment of the present disclosure determines whether the field of view of the second rear vehicle with respect to the vehicle is obscured based on the overall height of the first rear vehicle.

In FIG. 3A, reference numeral 310 indicates a vehicle (reference vehicle), reference numeral 320 indicates the first rear vehicle, and reference numeral 330 indicates the second rear vehicle. Reference numeral $H_0$ indicates the overall height of the vehicle 310, and reference numeral $H_1$ represents the overall height of the first rear vehicle 320.

As shown in FIG. 3A, when the overall height $H_1$ of the first rear vehicle 320 is higher than the overall height $H_0$ of the vehicle 310, even though the separation distance $D_{block}$ from the first rear vehicle 320 becomes infinity, the second rear vehicle 330 cannot secure the field of view with respect to the vehicle 310. That is, the vehicle 310 is covered by the first rear vehicle 320 so that the driver of the second rear vehicle 330 cannot see the vehicle 310.

Figure 3B:
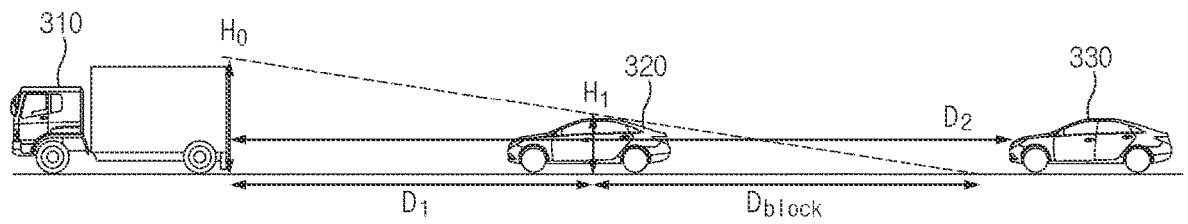
FIG. 3B is another exemplary diagram illustrating a process in which a controller provided in an apparatus for controlling a stop of a vehicle according to an embodiment of the present disclosure determines whether the field of view of the second rear vehicle with respect to the vehicle is obscured based on the overall height of the first rear vehicle.

FIG. 3B is another exemplary diagram illustrating a process in which a controller provided in an apparatus for controlling a stop of a vehicle according to an embodiment of the present disclosure determines whether the field of view of the second rear vehicle with respect to the vehicle is obscured based on the overall height of the first rear vehicle.

In FIG. 3B, reference numeral $D_1$ indicates the separation distance between the vehicle 310 and the first rear vehicle 320, and reference numeral $D_2$ indicates the separation distance between the vehicle 310 and the second rear vehicle 330. Reference numeral $D_{block}$, which is the separation distance from the first rear vehicle 320, represents a threshold distance at which the second rear vehicle 330 cannot secure the field of view to the vehicle 310 due to the first rear vehicle 320. The controller 20 may calculate the threshold distance $D_{block}$ based on following Equation 1.

[Equation 1]

$$D_{block} = \frac{H_1 \times D_1}{H_0 - H_1}$$

Where $H_0$ represents the overall height of the vehicle 310 and $H_1$ represents the overall height of the first rear vehicle 320.

As shown in FIG. 3B, when the overall height $H_1$ of the first rear vehicle 320 is lower than the overall height $H_0$ of the vehicle 310 and the second rear vehicle 330 is not located within the threshold distance $D_{block}$ from the first rear vehicle 320, the controller 20 may determine that the second rear vehicle 330 has secured the field of view with respect to the vehicle 310.

Figure 4A:
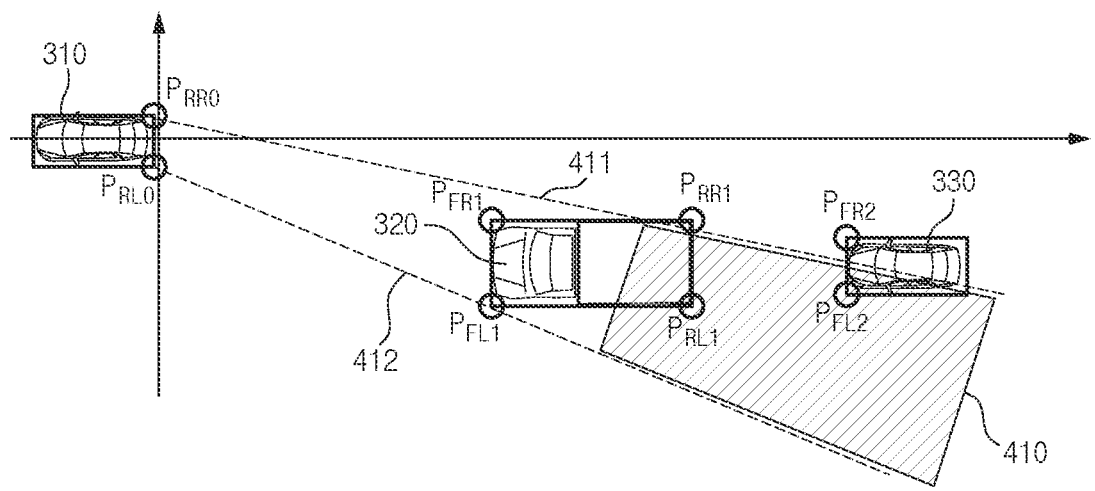
FIG. 4A is an exemplary view illustrating a process in which a controller provided in an apparatus for controlling a stop of a vehicle according to an embodiment of the present disclosure determines whether the field of view of the second rear vehicle with respect to the vehicle is obscured based on the overall width of the first rear vehicle.

FIG. 4A is an exemplary diagram illustrating a process in which a controller provided in an apparatus for controlling a stop of a vehicle according to an embodiment of the present disclosure determines whether the field of view of the second rear vehicle with respect to the vehicle is obscured based on the overall width of the first rear vehicle.

In FIG. 4A, $P_{RR0}$ represents the rear right end of the vehicle 310, $P_{RL0}$ represents the rear left end of the vehicle 310, $P_{FR1}$ represents the front right end of the first rear vehicle 320, $P_{RL1}$ represents the front left end of the first rear vehicle 320, $P_{RR1}$ represents the rear right end of the first rear vehicle 320, $P_{RL1}$ represents the rear left end of the first rear vehicle 320, $P_{FR2}$ represents the front right end of the second rear vehicle 330, and $P_{FL2}$ represents the front left end of the second rear vehicle 330.

As shown in FIG. 4A, the controller 20 may set a straight line 411 connecting the rear right end $P_{RR0}$ of the vehicle 310 and the rear right end $P_{RR1}$ of the first rear vehicle 320 as a right boundary line of an area 410, and may set a straight line 412 connecting the rear left end $P_{RL0}$ of the vehicle 310 and the front left end $P_{FL1}$ of the first rear vehicle 320 as a left boundary line of the area 410.

The controller 20 may generate straight lines where the rear right end $P_{RR0}$ of the vehicle 310 and the right side surface of the first rear vehicle 320 meet. In this case, the inclination of the straight line connecting the rear right end $P_{RR0}$ of the vehicle 310 and the front right end $P_{FR1}$ of the first rear vehicle 320 is the smallest, and the inclination of the straight line 411 is the largest. Accordingly, the controller 20 may set the straight line 411 with the inclination as the right boundary line of the area 410 in order to generate the maximum area in which the driver of the second rear vehicle 330 cannot see the vehicle 310 because the vehicle 310 is obscured by the first rear vehicle 320.

The controller 20 may generate straight lines where the rear left end PRL0 of the vehicle 310 and the left side surface of the first rear vehicle 320 meet. In this case, the controller 20 determines that the inclination of the straight line connecting the rear left end $P_{RL0}$ of the vehicle 310 and the rear left end $P_{RL1}$ of the first rear vehicle 320 is the largest, and the inclination of the straight line 412 is the smallest. Accordingly, the controller 20 may set the straight line 412 with the smallest inclination as the left boundary of the area 410 in order to generate the maximum area in which the driver of the second rear vehicle 330 cannot see the vehicle 310 because the vehicle 310 is obscured by the first rear vehicle 320.

As a result, the controller 20 may select a straight line with the greatest inclination when setting the right boundary line of the area 410 based on the rear right end $P_{RR0}$ of the vehicle 310, and may select a straight line with the smallest inclination when setting the left boundary line of the area 410 based on the rear left end $P_{RL0}$ of the vehicle 310.

In FIG. 4A, because a part (e.g., $P_{FL2}$) of the second rear vehicle 330 is included in the area 410, the controller 20 may determine that the field of view of the second rear vehicle 330 (e.g., $P_{FL2}$) with respect to the vehicle 310 is not secured by the overall width of the first rear vehicle 320.

Figure 4B:
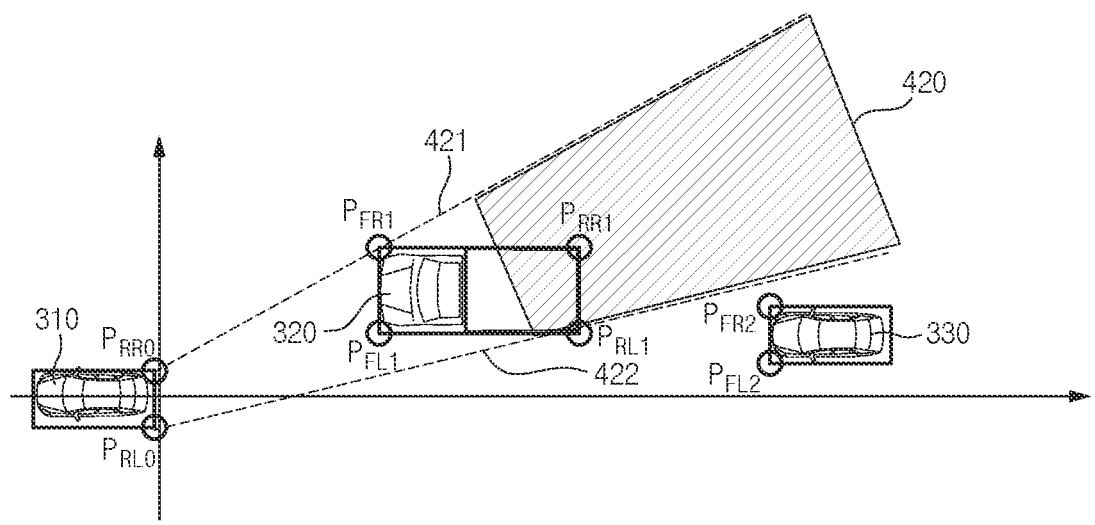
FIG. 4B is another exemplary diagram illustrating a process in which a controller provided in an apparatus for controlling a stop of a vehicle according to an embodiment of the present disclosure determines whether the field of view of the second rear vehicle with respect to the vehicle is obscured based on the overall width of the first rear vehicle.

FIG. 4B is another exemplary diagram illustrating a process in which a controller provided in an apparatus for controlling a stop of a vehicle according to an embodiment of the present disclosure determines whether the field of view of the second rear vehicle with respect to the vehicle is obscured based on the overall width of the first rear vehicle.

As shown in FIG. 4B, the controller 20 may set a straight line 421 connecting the rear right end $P_{RR0}$ of the vehicle 310 and the front right end $P_{FR1}$ of the first rear vehicle 320 as the right boundary line of an area 420, and may set a straight line 422 connecting the rear left end $P_{RL0}$ of the vehicle 310 and the rear left end $P_{RL1}$ of the first rear vehicle 320 as the left boundary line of the area 420.

In FIG. 4B, because a part (e.g., $P_{FL2}$ or $P_{FR2}$) of the second rear vehicle 330 is not included in the area 420, the controller 20 may determine that the field of view of the second rear vehicle 330 with respect to the vehicle 310 is secured.

Through this process, the controller 20 may determine whether or not the field of view of the second rear vehicle 330 with respect to the vehicle 310 has been obscured due to the first rear vehicle 320. In this case, the controller 20 may determine whether the field of view of the second rear vehicle 330 with respect to the vehicle 310 is obscured in consideration of only the overall height of the first rear vehicle 320, determine whether the field of view of the second rear vehicle 330 with respect to the vehicle 310 is obscured in consideration of only the overall width of the first rear vehicle 320, or determine whether the field of view of the second rear vehicle 330 with respect to the vehicle 310 is obscured in consideration of both the overall height and overall width of the first rear vehicle 320.

Figure 4C:
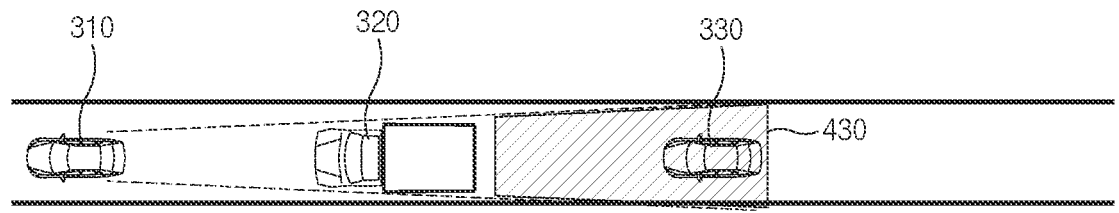
FIGS. 4C, 4D, and 4E are various exemplary diagrams illustrating a process in which a controller provided in an apparatus for controlling a stop of a vehicle according to an embodiment of the present disclosure determines whether the field of view of the second rear vehicle with respect to the vehicle is obscured based on the overall width of the first rear vehicle.
Figure 4D:
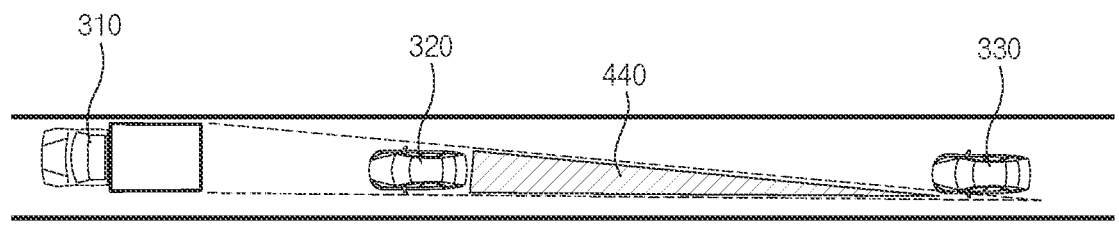
Figure 4E:
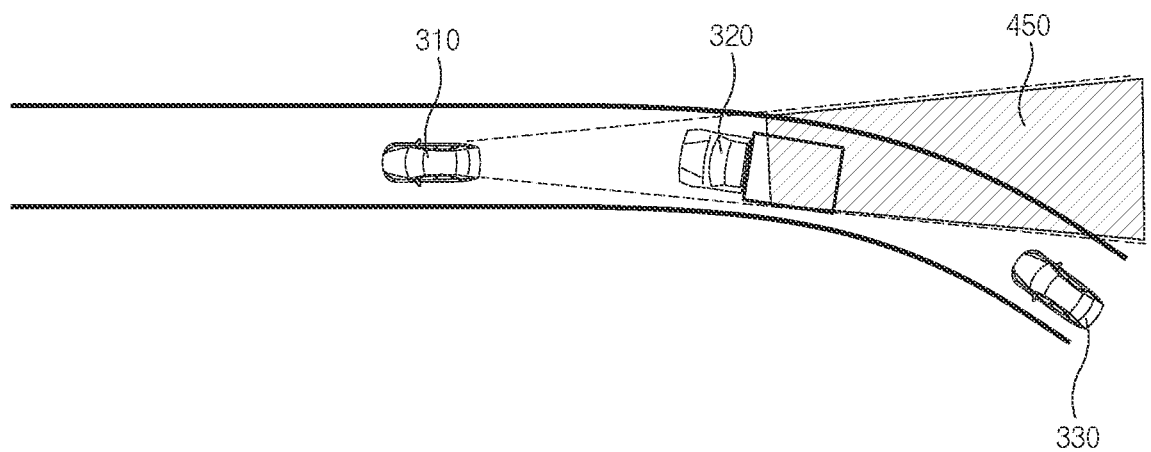

FIGS. 4C, 4D, and 4E are various exemplary diagrams illustrating a process in which a controller provided in an apparatus for controlling a stop of a vehicle according to an embodiment of the present disclosure determines whether the field of view of the second rear vehicle with respect to the vehicle is obscured based on the overall width of the first rear vehicle.

As shown in FIG. 4C, because the second rear vehicle 330 is located in an area 430, the controller 20 may determine that the field of view of the second rear vehicle 330 with respect to the vehicle 310 is not secured.

As shown in FIG. 4D, because the second rear vehicle 330 is not located within an area 440, the controller 20 may determine that the field of view of the second rear vehicle 330 with respect to the vehicle 310 is secured.

As shown in FIG. 4E, because the second rear vehicle 330 is not located within an area 450, the controller 20 may determine that the field of view of the second rear vehicle 330 with respect to the vehicle 310 is secured.

Figure 5:
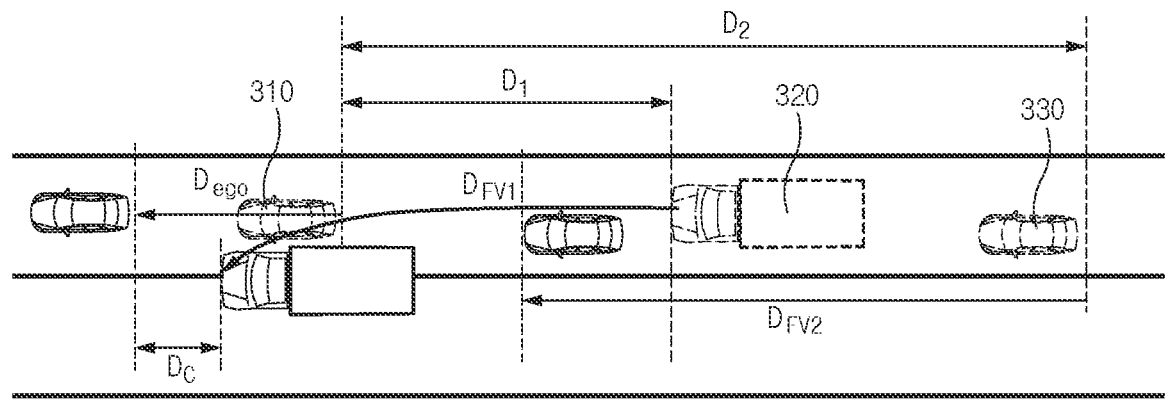
FIG. 5 is an exemplary diagram illustrating a process in which a controller provided in an apparatus for controlling a stop of a vehicle according to an embodiment of the present disclosure estimates the relative distance and relative speed of the vehicle with the second rear vehicle according to the virtual stop of the vehicle.

FIG. 5 is an exemplary diagram illustrating a process in which a controller provided in an apparatus for controlling a stop of a vehicle according to an embodiment of the present disclosure estimates the relative distance and relative speed of the vehicle with the second rear vehicle according to the virtual stop of the vehicle.

In FIG. 5, $D_1$ denotes the distance between the vehicle 310 and the first rear vehicle 320 before the vehicle 310 stops virtually, and $D_2$ denotes the distance between the vehicle 310 and the second rear vehicle 330 before the vehicle 310 stops virtually. In addition, $D_{ego}$ denotes the distance traveled by the vehicle 310 for "t" seconds in a operation of virtually stopping the vehicle 310, $D_c$ which is a reference distance between the vehicle 310 and the first rear vehicle 320 represents the minimum distance at which the first rear vehicle 320 can perform a lane change, $D_{FV1}$ denotes the distance traveled by the first rear vehicle 320 for "t" seconds in the process of virtually stopping the vehicle 310, and $D_{FV2}$ denotes the distance traveled by the second rear vehicle 330 for "t" seconds in a process of virtually stopping the vehicle 310.

The controller 20 may estimate a relative distance DR with the second rear vehicle 330 according to the virtual stop of the vehicle 310 based on following Equation 1.

$$D_R = D_2 + D_{ego} - D_{FV2} \qquad \text{[Equation 1]}$$

When it is assumed that the speed of the vehicle 310 after "t" seconds in the process of virtually stopping the vehicle 310 is $V_{ego}$, and the speed of the second rear vehicle 330 after "t" seconds in the process of virtually stopping the vehicle 310 is $V_{FV2}$, the controller 20 may estimate the relative speed of the vehicle 310 ($V_{ego}-V_{FV2}$) of the second rear vehicle 330.

As a result, the controller 20 may adjust the acceleration (or deceleration) of the vehicle 310 based on the collision risk corresponding to the estimated relative distance and relative speed of the vehicle 310 with the second rear vehicle 330 estimated. That is, when the collision risk by the second rear vehicle 330 is high, the controller 20 may reduce the deceleration of the vehicle 310 to slowly stop the vehicle 310, and when the collision risk by the second rear vehicle 330 is low, the controller 20 may increase the deceleration of the vehicle 310 to quickly stop the vehicle 310. In one embodiment, the collision risk may be determined 'high' when the relative distance does not exceed a first reference distance and relative speed exceeds a first reference speed, and the collision risk may be determined 'low' when the relative distance exceeds the first reference distance and relative speed does not exceed the first reference speed.

Figure 6:
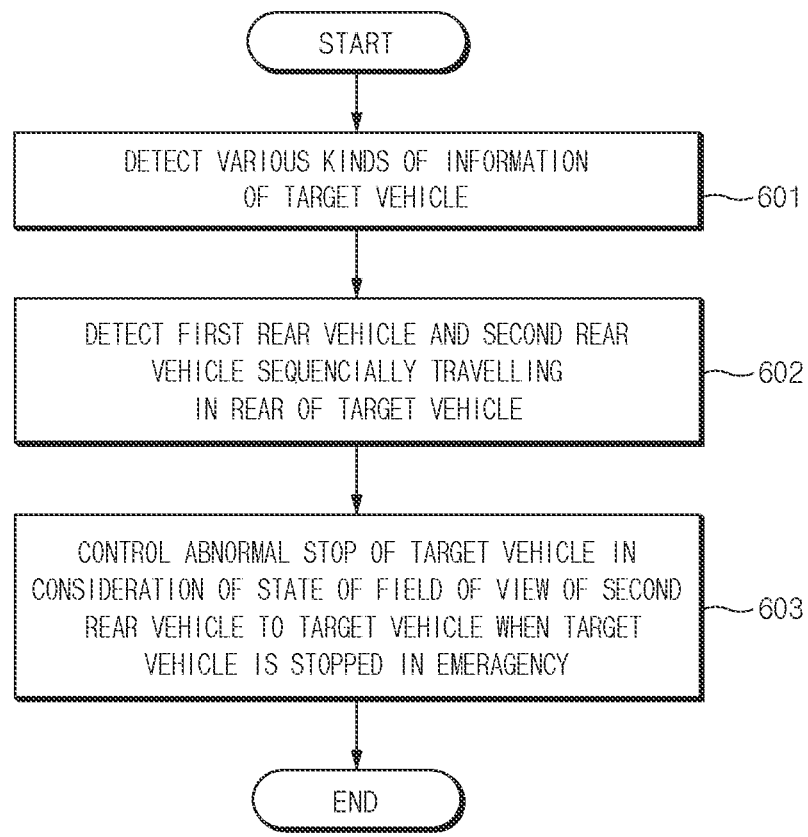
FIG. 6 is a flowchart illustrating a method of controlling a stop of a vehicle according to an embodiment of the present disclosure.

FIG. 6 is a flowchart illustrating a method of controlling a stop of a vehicle according to an embodiment of the present disclosure.

First, in 601, the vehicle sensor 400 detects various information of a target vehicle 310.

Then, in 602, the rear sensor 200 detects the first rear vehicle 320 and the second rear vehicle 330 that are sequentially traveling in the rear of the target vehicle 310.

Then, in 603, when the target vehicle 310 is stopped in emergency, the controller 20 controls the emergency stop of the target vehicle 310 in consideration of the state of the field of view of the second rear vehicle 330 with respect to the target vehicle 310.

Figure 7:
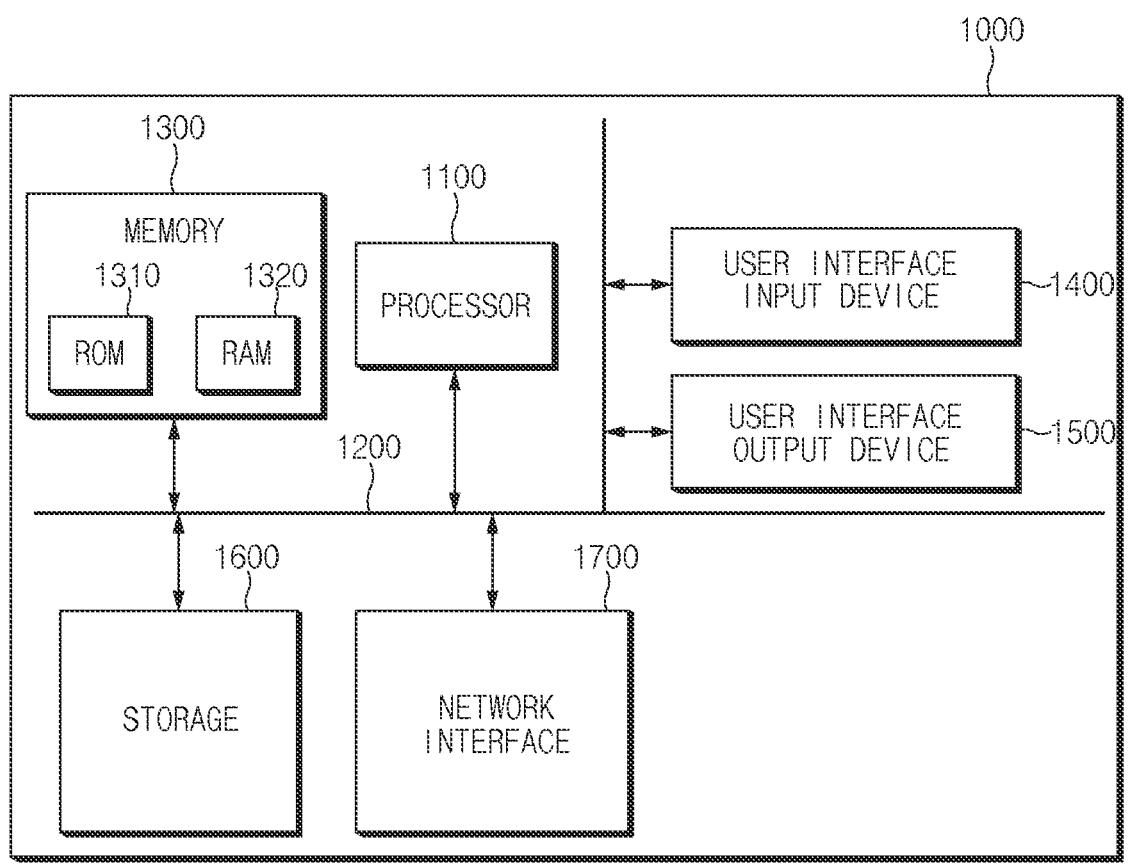
FIG. 7 is a block diagram illustrating a computing system for executing a method of controlling a stop of a vehicle according to an embodiment of the present disclosure.

FIG. 7 is a block diagram illustrating a computing system for executing a method of controlling a stop of a vehicle according to an embodiment of the present disclosure.

Referring to FIG. 7, as described above, the method of controlling a stop of a vehicle according to an embodiment of the present disclosure may be implemented through a computing system. The computing system 1000 may include at least one processor 1100, a memory 1300, a user interface input device 1400, a user interface output device 1500, storage 1600, and a network interface 1700 connected through a system bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

As described above, according to the embodiments, the apparatus for controlling a stop of a vehicle and the method thereof emergency stopping of the vehicle in consideration of the visibility state of a rear vehicle traveling in the same lane as the vehicle when the vehicle is stopped in emergency, such that it is possible to prevent a collision accident that may be caused by the rear vehicle in advance when the vehicle is stopped in emergency.

As described above, according to the embodiments, the apparatus for controlling a stop of a vehicle and the method thereof can control the emergency stop of the vehicle in consideration of the visibility state of the second rear vehicle when the vehicle is stopped in emergency in a situation in which the vehicle, the first rear vehicle and the second rear vehicle are sequentially driving, such that it is possible to prevent a collision accident that may be caused by the second rear vehicle in advance when the vehicle is stopped in emergency even though the field of view of the second rear vehicle is not secured due to the first rear vehicle.

As described above, according to the embodiments, the apparatus for controlling a stop of a vehicle and the method thereof can estimate the relative distance and relative speed of the vehicle with the second rear vehicle according to the virtual stop of the vehicle and adjust the speed (acceleration or deceleration) of the vehicle based on the collision risk corresponding to the estimated relative distance and relative speed of the vehicle when the field of view of the second rear vehicle with respect to the vehicle is not secured due to the first rear vehicle when the vehicle is stopped in emergency in a situation where the vehicle, the first rear vehicle and the second rear vehicle are sequentially driven, such that it is possible to prevent a collision accident that may be caused by the second rear vehicle in advance when the vehicle is stopped in emergency. The above description is a simple exemplification of the technical spirit of the present disclosure, and the present disclosure may be variously corrected and modified by those skilled in the art to which the present disclosure pertains without departing from the essential features of the present disclosure.

Therefore, the disclosed embodiments of the present disclosure do not limit the technical spirit of the present disclosure but are illustrative, and the scope of the technical spirit of the present disclosure is not limited by the embodiments of the present disclosure. The scope of the present disclosure should be construed by the claims, and it will be understood that all the technical spirits within the equivalent range fall within the scope of the present disclosure.

What is claimed is:

1. An apparatus for controlling a stop of a target vehicle, the apparatus comprising:
    a vehicle sensor configured to detect various types of information on the target vehicle;
    a rear sensor configured to detect a first rear vehicle and a second rear vehicle sequentially driving behind the target vehicle; and
    a controller electrically connected to the vehicle sensor and the rear sensor and configured to control an emergency stop of the target vehicle in consideration of a state of a field of view of the second rear vehicle with respect to the target vehicle when the target vehicle is stopped in emergency.

2. The apparatus of claim 1, wherein the controller is configured to adjust a speed of the target vehicle based on a collision risk of the second rear vehicle when the field of view of the second rear vehicle with respect to the target vehicle is not secured due to the first rear vehicle.

3. The apparatus of claim 1, wherein the controller is configured to estimate a relative distance and a relative speed with the second rear vehicle according to a virtual stop of the target vehicle, and adjust a speed of the target vehicle based on a collision risk corresponding to the relative distance and the relative speed when the field of view of the second rear vehicle with respect to the target vehicle is not secured due to the first rear vehicle.

4. The apparatus of claim 3, wherein the controller is configured to decrease a deceleration of the target vehicle when the relative distance does not exceed a first reference distance and relative speed exceeds a first reference speed, and increase the deceleration of the target vehicle when the relative distance exceeds the first reference distance and relative speed does not exceed the first reference speed.

5. The apparatus of claim 1, wherein the controller is configured to determine that the field of view of the second rear vehicle with respect to the target vehicle is not secured when at least one of a visibility limitation of the second rear vehicle according to an overall height of the target vehicle and an overall height of the first rear vehicle or a visibility limitation of the second rear vehicle according to an overall width of the target vehicle and an overall width of the first rear vehicle occurs.

6. The apparatus of claim 5, wherein the controller is configured to determine that the field of view of the second rear vehicle is not secured when the overall height of the target vehicle is lower than the overall height of the first rear vehicle.

7. The apparatus of claim 5, wherein the controller is configured to determine that the field of view of the second rear vehicle is secured only when the second rear vehicle is spaced apart from the first rear vehicle by more than a threshold distance when the overall height of the target vehicle is higher than the overall height of the first rear vehicle.

8. The apparatus of claim 7, wherein the controller is configured to calculate the threshold distance based on the overall height of the first rear vehicle, a separation distance between the target vehicle and the first rear vehicle, and the overall height of the target vehicle.

9. The apparatus of claim 5, wherein the controller is configured to set a threshold area based on the overall width of the target vehicle and the overall width of the first rear vehicle, and determine that the field of view of the second rear vehicle is not secured when all or a part of the second rear vehicle is included in the threshold area.

10. The apparatus of claim 9, wherein the controller is configured to set a straight line having a largest inclination among straight lines where a rear right end of the target vehicle and a rear right side of the first rear vehicle meet as a right boundary line of the threshold area, and set a straight line having a smallest inclination among straight lines where a rear left end of the target vehicle and a rear left side surface of the first rear vehicle meet as a left boundary line of the threshold area.

11. A method of controlling a stop of a target vehicle, the method comprising:
  detecting, by a vehicle sensor, various types of information on the target vehicle;
  detecting, by a rear sensor, a first rear vehicle and a second rear vehicle sequentially driving behind the target vehicle; and
  controlling, by a controller, an emergency stop of the target vehicle in consideration of a state of a field of view of the second rear vehicle with respect to the target vehicle when the target vehicle is stopped in emergency, wherein the controller is electrically connected to the vehicle sensor and the rear sensor.

12. The method of claim 11, wherein the controlling of the emergency stop of the target vehicle includes:
  adjusting a speed of the target vehicle based on a collision risk of the second rear vehicle when the field of view of the second rear vehicle with respect to the target vehicle is not secured due to the first rear vehicle.

13. The method of claim 11, wherein the controlling of the emergency stop of the target vehicle includes:
  estimating a relative distance and a relative speed with the second rear vehicle according to a virtual stop of the target vehicle when the field of view of the second rear vehicle with respect to the target vehicle is not secured due to the first rear vehicle; and
  adjusting a speed of the target vehicle based on a collision risk corresponding to the relative distance and the relative speed.

14. The method of claim 13, wherein the adjusting of the speed of the target vehicle includes:
  decreasing a deceleration of the target vehicle when the relative distance does not exceed a first reference distance and relative speed exceeds a first reference speed, and
  increasing the deceleration of the target vehicle when the relative distance exceeds the first reference distance and relative speed does not exceed the first reference speed.

15. The method of claim 11, wherein the controlling of the emergency stop of the target vehicle includes:
  first determining that the field of view of the second rear vehicle is not secured based on an overall height of the target vehicle and an overall height of the first rear vehicle;
  second determining that the field of view of the second rear vehicle is not secured based on an overall width of the target vehicle and an overall width of the first rear vehicle; and
  final determining that the field of view of the second rear vehicle is not secured based on at least one of the first determining or the second determining.

16. The method of claim 15, wherein the first determining includes:
  determining that the field of view of the second rear vehicle is not secured when the overall height of the target vehicle is lower than the overall height of the first rear vehicle.

17. The method of claim 15, wherein the first determining includes:
  determining that the field of view of the second rear vehicle is secured only when the second rear vehicle is spaced apart from the first rear vehicle by more than a threshold distance when the overall height of the target vehicle is higher than the overall height of the first rear vehicle.

18. The method of claim 17, wherein the first determining includes:
  calculating the threshold distance based on the overall height of the first rear vehicle, a separation distance between the target vehicle and the first rear vehicle, and the overall height of the target vehicle.

19. The method of claim 15, wherein the second determining includes:

setting a threshold area based on the overall width of the target vehicle and the overall width of the first rear vehicle; and determining that the field of view of the second rear vehicle is not secured when all or a part of the second rear vehicle is included in the threshold area.

20. The method of claim 19, wherein the setting of the threshold area includes:

setting a straight line having a largest inclination among straight lines where a rear right end of the target vehicle and a rear right side of the first rear vehicle meet as a right boundary line of the threshold area; and setting a straight line having a smallest inclination among straight lines where a rear left end of the target vehicle and a rear left side surface of the first rear vehicle meet as a left boundary line of the threshold area.

* * * * *